US012597230B2

(12) United States Patent
Baltaxe et al.

(10) Patent No.: US 12,597,230 B2
(45) Date of Patent: Apr. 7, 2026

(54) SYSTEM AND METHOD FOR TRAINING AND UTILIZING AN OBJECT-CENTRIC OCCUPANCY ESTIMATION MODEL

(71) Applicant: GM GLOBAL TECHNOLOGY OPERATIONS LLC, Detroit, MI (US)

(72) Inventors: Michael Baltaxe, Kfar Saba (IL); Dan Levi, Ganei Tikvah (IL)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 18/425,062

(22) Filed: Jan. 29, 2024

(65) Prior Publication Data

US 2025/0245961 A1 Jul. 31, 2025

(51) Int. Cl.
*G06V 10/75* (2022.01)
*G06V 20/58* (2022.01)

(52) U.S. Cl.
CPC ............ *G06V 10/751* (2022.01); *G06V 20/58* (2022.01)

(58) Field of Classification Search
None
See application file for complete search history.

(56) References Cited

U.S. PATENT DOCUMENTS 11,495,012 B1 * 11/2022 Hwang .................. G06V 20/56
12,060,082 B1 * 8/2024 Garimella ....... B60W 30/18159

2021/0397855 A1 * 12/2021 Guizilini .............. G06V 10/751
2022/0237402 A1 * 7/2022 Unnikrishnan ........ G06V 20/58
2024/0176018 A1 * 5/2024 Weikersdorfer ...... G01S 15/931
2024/0221386 A1 * 7/2024 Appaya Dhanabalan ...................
G06T 7/73

OTHER PUBLICATIONS

Tu, Chuang, Liu, Sun, Zhang, Roy, Kuo, Sun; Proceedings of the IEEE/CVF International Conference on Computer Vision; 2023. S. 6996-7007. (online abrufbar Ober https://openaccess.thecvf.com/content/ICCV2023/papers/Tu ImGeoNet Imageinduced Geometry-aware Voxel Representation for Multiview 3D Object Detection ICCV 2023 paper.pdf).

Rukhovich, Vorontsova, Konushin; Imvoxelnet: Image to voxels projection for monocular and multi-view general-purpose 3d object detection; Proceedings of the IEEE/CVF Winter Conference on Applications of Computer Vision. 2022. S. 2397-2406. (online abrufbar Ober https://openaccess.thecvf.com/content/WACV2022/papers/ Rukhovich ImVoxelNet Image to Voxels Projection for Monocular and Multi-View GeneralPurpose WACV 2022 paper. pdf).

(Continued)

*Primary Examiner* — Thomas D Lee
(74) *Attorney, Agent, or Firm* — Quinn IP Law

(57) ABSTRACT

A method of updating parameters of an occupancy estimation model. The method includes receiving images that are two-dimensional. An occupancy estimation model is utilized to generate a voxel based on the images. An occupancy loss is determined by comparing the voxel to an occupancy ground truth corresponding to the voxel. An object loss is determined by comparing the voxel to an object ground truth. The object loss is combined with the occupancy loss to determine a total loss for the voxel. Parameters of the occupancy estimation model are updated to reduce the total loss determined.

20 Claims, 3 Drawing Sheets

100

(56) References Cited

OTHER PUBLICATIONS

Wang< Zhang< Zhou, Sun, Zhang, Wang: Automatic detection of indoor occupancy based on improved YOLOv5 model; Neural Computing and Applications, 2023, 35. Jg., Nr. 3, S. 2575-2599, doi:10.1007/00521-022-07730-3.

Liu, Liu; Voxel-based 3D detection and reconstruction of multiple objects from a single image; Advances in Neural Information Processing Systems, 2021, 34. Jg., S. 1-14. ( on line abrufbar Ober https://proceedings.neurips.cc/paperfiles/paper/2021 /file/ 1415db70fe9ddb119e23e9b280 8cde38-Paper.pdf).

Zhang, Zhu, Du; Voxel-based 3D detection and reconstruction of multiple objects from a single image; Advances in Neural Information Processing Systems, 2021, 34. Jg., S. 1-14. ( on line abrufbar Ober https://proceedings.neurips.cc/paper files/paper/2021 /file/ 1415db70fe9ddb119e23e9b280 8cde38-Paper.pdf).

* cited by examiner

SYSTEM AND METHOD FOR TRAINING AND UTILIZING AN OBJECT-CENTRIC OCCUPANCY ESTIMATION MODEL

INTRODUCTION

Vehicles are a staple of everyday life. Special-use cameras, microcontrollers, laser technologies, and sensors may be used in many different applications in a vehicle. These devices can be used to provide an operator of the vehicle with an improved view of an area surrounding the vehicle or to provide fully or semi-autonomous functions for the vehicle. Multiple approaches have been developed to incorporate autonomous or semi-autonomous functions into vehicles, such as through the use of artificial intelligence (AI).

SUMMARY

Disclosed herein is a method of updated parameters of an occupancy estimation model. The method includes receiving images that are two-dimensional. The occupancy estimation model is utilized to generate a voxel based on the images. An occupancy loss is determined by comparing the voxel to an occupancy ground truth corresponding to the voxel. An object loss is determined by comparing the voxel to an object ground truth. The object loss is combined with the occupancy loss to determine a total loss for the voxel. Parameters of the occupancy estimation model are updated to reduce the total loss determined.

Another aspect of the disclosure may include applying a weight to the object loss when combined with the occupancy loss to determine the total loss.

Another aspect of the disclosure may be where comparing the voxel to the occupancy ground truth is performed on a voxel-wise cross-entropy basis.

Another aspect of the disclosure may be where the object loss is multiplied by a weight before being combined with the occupancy loss to determine the total loss.

Another aspect of the disclosure may be where the object loss includes an object detection loss and utilizing an object detection model to identify detected objects in the voxel.

Another aspect of the disclosure may be where the object detection loss includes comparing an object ground truth for the voxel to the detected objects.

Another aspect of the disclosure may be where comparing the object ground truth for the voxel to the detected objects includes at least one of cross-entropy or shape regression.

Another aspect of the disclosure may be where the object loss includes an object fullness loss and determining the object fullness loss includes comparing a set of occupied voxels defined within a bounding box from the object ground truth compared to a probability of occupancy estimated by the occupancy estimation model.

Disclosed herein is a non-transitory computer-readable storage medium embodying programmed instructions which, when executed by a processor, are operable for performing a method. The method includes receiving images that are two-dimensional. An occupancy estimation model is utilized to generate a voxel based on the images. An occupancy loss is determined by comparing the voxel to an occupancy ground truth corresponding to the voxel. An object loss is determined by comparing the voxel to an object ground truth. The object loss is combined with the occupancy loss to determine a total loss for the voxel. Parameters of the occupancy estimation model are updated to reduce the total loss determined.

Disclosed herein is a vehicle system. The system includes at least one optical sensor and a controller in data communication with the at least one sensor, wherein the controller is configured to receive two-dimensional optical images and perform an occupancy estimation on the images with an occupation estimation model to generate a voxel. The controller is also configured to perform a three-dimensional object detection on the images to identify at least one region associated with an object of interest. The controller is further configured to vary a probability threshold for identifying an object in the voxel based on the three-dimensional object detection. The probability threshold for identifying objects is reduced for a portion of the voxel that corresponds to the at least one region associated with the object of interest when compared to the probability threshold for identifying the objects outside of the at least one region associated with the object of interest.

Another aspect of the disclosure may be where the occupation estimation model is trained by receiving a plurality of training images, wherein the plurality of training images are two-dimensional and utilizing an occupancy estimation model to generate a voxel based on the images. The occupation estimation model is further trained by determining an occupancy loss by comparing the voxel to an occupancy ground truth corresponding to the voxel and determining an object loss by comparing the voxel to an object ground truth. The object loss is combined with the occupancy loss to determine a total loss for the voxel for updating parameters of the occupancy estimation model to reduce the total loss determined.

Another aspect of the disclosure may be where the object loss includes an object detection loss and utilizing an object detection model to identify detected objects in the voxel with the object detection loss including comparing an object ground truth for the voxel to the detected objects. Additionally, the object ground truth for the voxel is compared to the detected objects includes at least one of cross-entropy or shape regression.

Another aspect of the disclosure may be where the object loss includes an object fullness loss and determining the object fullness loss includes comparing a set of occupied voxels defined within a bounding box from the object ground truth compared to a probability of occupancy estimated by the occupancy estimation model.

BRIEF DESCRIPTION OF THE DRAWINGS

Some embodiments of the present disclosure are now described, by way of example only, and regarding the accompanying drawings. The same reference number represents the same element or the same type of element on all drawings.

DETAILED DESCRIPTION

Figure 1:
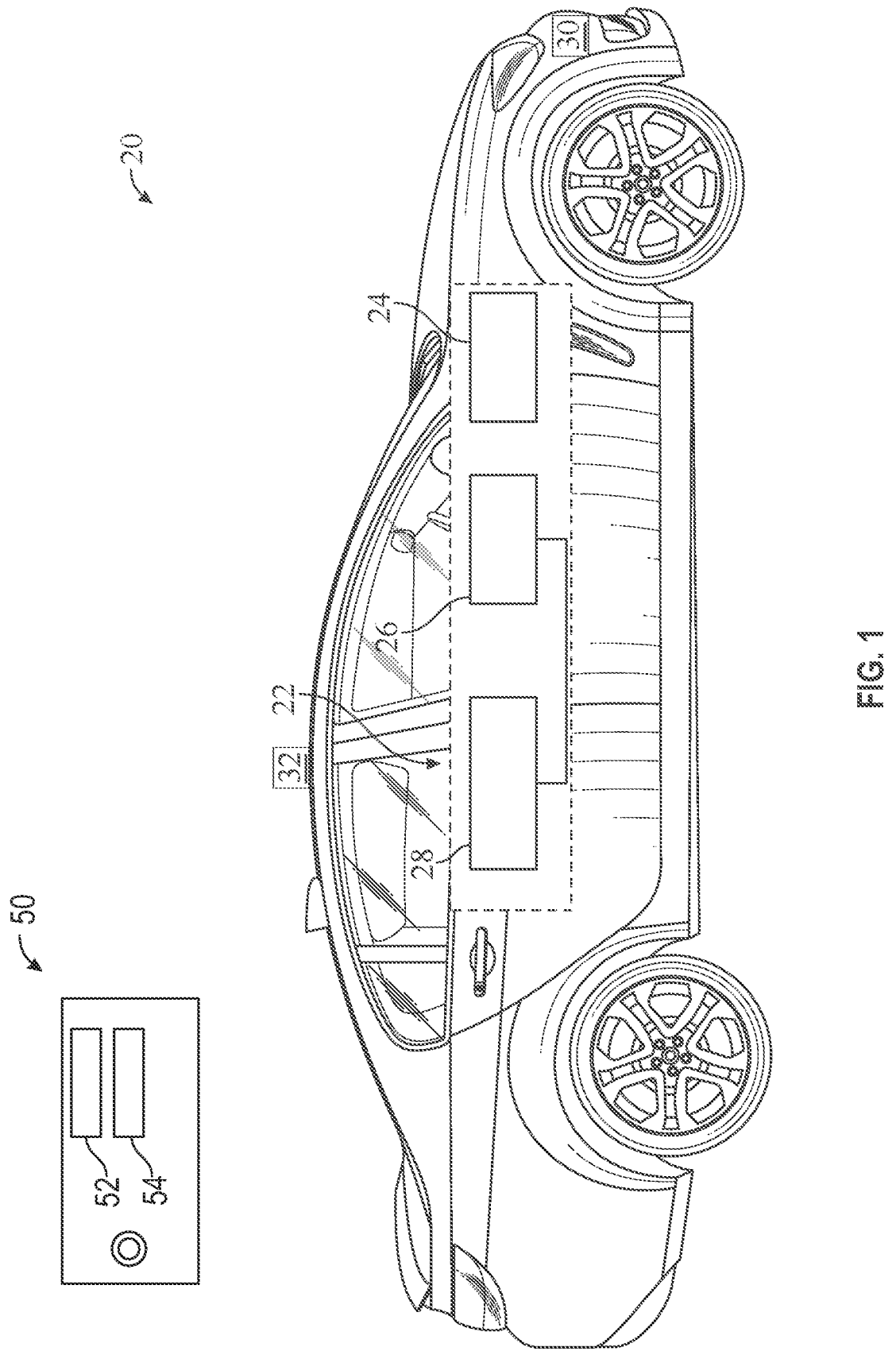
FIG. 1 illustrates an example vehicle system incorporating a driving system having a plurality of sensors in communication with a controller.

The present disclosure is susceptible to embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly outlined in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive. The words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function can perform the specified function without alteration, rather than merely having the potential to perform the specified function after further modification. In other words, the described hardware, when expressly configured to perform the specified function, is specifically selected, created, implemented, utilized, programmed, and/or designed to perform the specified function.

In accordance with an exemplary embodiment, FIG. 1 shows a vehicle 20 that can be operated in an autonomous mode or automated mode. The vehicle 20 can be a fully autonomous vehicle or a semi-autonomous vehicle. The vehicle 20 includes a driving system 22 that controls the autonomous operation of the vehicle. The driving system 22 includes a sensor system 24 for obtaining information about the surroundings or environment of the vehicle 20 and a controller 26 for computing possible actions for the autonomous vehicle based on the obtained information and for implementing one or more of the possible actions, and a human-machine interface 28 for communicating with an occupant of the vehicle, such as a driver or passenger. The sensor system 24 can include at least one optical sensor 30, such as at least one camera, at least one distance sensor 32, such as a depth camera (RGB-D) or Lidar.

The controller 26 may include processing circuitry that may include an application-specific integrated circuit (ASIC), an electronic circuit, a processor (shared, dedicated, or group) and memory that executes one or more software or firmware programs, a combinational logic circuit, and/or other suitable components that provide the described functionality. The controller 26 may include a non-transitory computer-readable medium that stores instructions which, when processed by one or more processors of the controller 26, implement the methods disclosed below.

Alternatively, the methods disclosed below can be performed on a remote computer system 50 is used for training at least one of a feature extraction neural network or an object detection neural network as will be described in greater detail below. While the computer system 50 of FIG. 1 is depicted as a unitary computer module for illustrative simplicity, the computer system 50 can be physically embodied as one or more processing nodes having a non-transitory computer-readable storage medium 54, i.e., application-sufficient memory, and associated hardware and software, such as but not limited to a high-speed clock, timer, input/output circuitry, buffer circuitry, and the like. The computer-readable storage medium 54 may include enough read-only memory, for instance, magnetic or optical memory. Computer-readable code or instructions embodying the methods described below may be executed during the operation of the computer system 50. To that end, the computer system 50 may encompass one or more processors 52, e.g., logic circuits, application-specific integrated circuits (ASICs), central processing units, microprocessors, and/or other requisite hardware as needed to provide the programmed functionality described herein.

Figure 2:
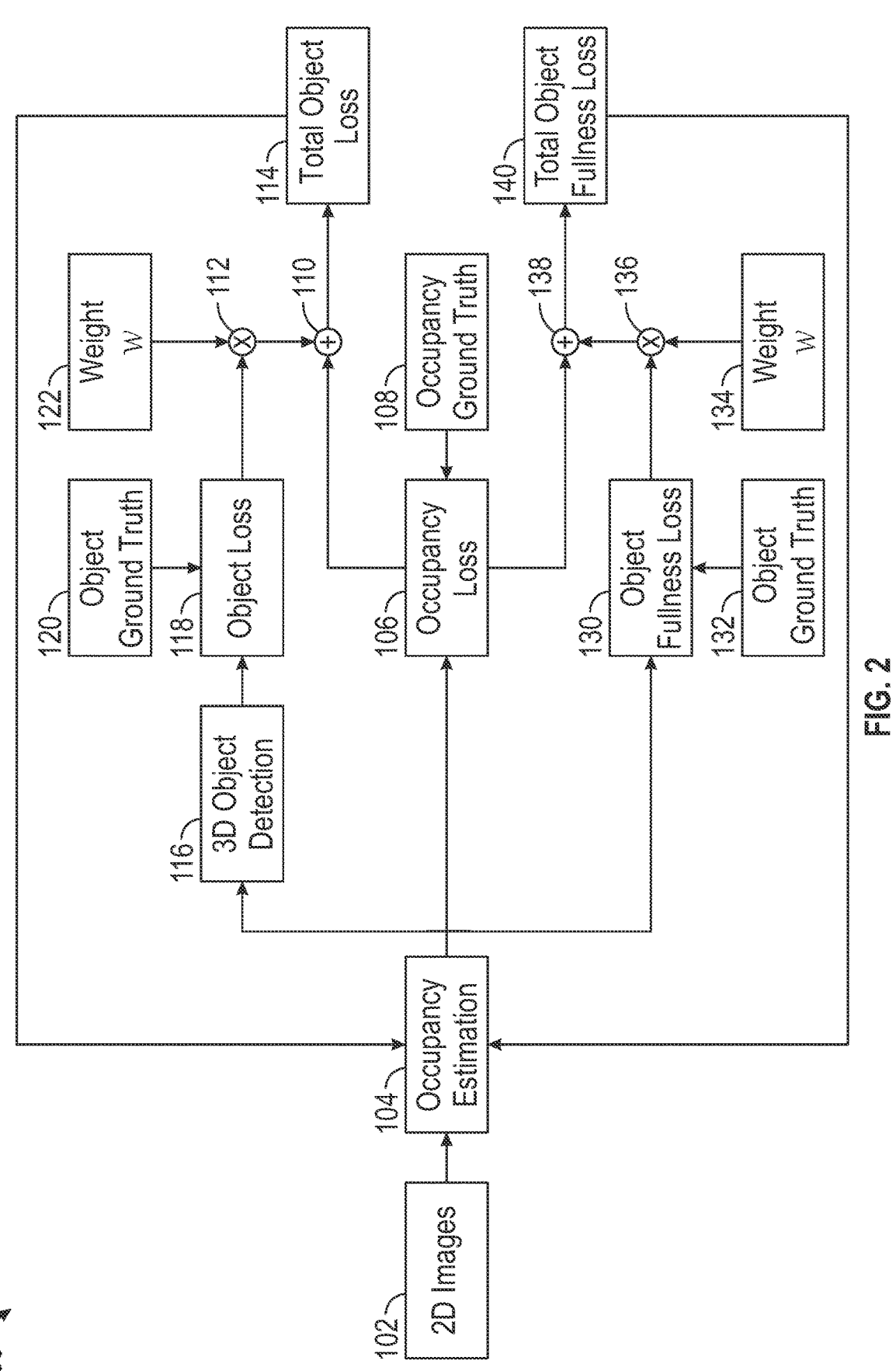
FIG. 2 illustrates a flowchart of a method of training an occupancy estimation model.

FIG. 2 illustrates a flow chart for a method 100 for generating an updated occupancy estimation model for improving the accuracy of the model to identify objects, such as cars, people, bicycles, etc., in an area surrounding the vehicle 20. The method 100 seeks up update parameters of the occupation estimation model through determining different types of losses, such as an occupancy loss, an object detection loss, or an object fullness loss as will be discussed in greater detail below. The method 100 can be performed iteratively until a degree of accuracy of the model or loss the model generates is below a predetermined threshold.

The occupancy estimation model is used to identify objects in a three-dimensional (3D) space surrounding the vehicle 20. The method 100 begins with collecting two-dimensional (2D) images at Block 102. In the illustrated example, the 2D images are collected from an area surrounding the vehicle 20. In one example, the 2D images are collected with one or more of the optical sensors 30 on the vehicle 20. The images from one or more of the optical sensors 30 may include a field of view that at least partially overlaps with another image. With the 2D images, the method 100 proceeds to Block 104 to perform an initial occupancy estimation based on the images from Block 102 with an occupancy estimation model.

In the illustrated example, the occupancy estimation model provides a probability that a point in 3D space is occupied by an object. In one example, the point in 3D space is represented by a voxel. The voxel defines a probability of an object occupying each point in the 3D space surrounding the vehicle 20 in a 3D voxel grid based on the images from Block 102. The occupancy estimation model utilizes a neural network to extract features from the 2D images of the area surrounding the vehicle 20. The occupancy estimation model then utilizes the extracted features to generate the 3D voxel grid that describes the scene in the images and can be used for identifying the type of object detected. A point cloud can be extracted from the voxel by applying a surface processing algorithm to the voxel to create a visual 3D representation of the scene. With the voxel from Block 104, the method 100 proceeds to Block 106 to determine an occupancy loss for the voxel.

In the illustrated example, the occupancy loss is determined by comparing the voxel generated at Block 104 to a dataset, such as an occupancy ground truth from Block 108. The occupancy ground truth represents the actual scene from by the 2D images to determine how closely the occupancy estimation model captured the actual scene represented in the ground truth. In one example, the occupancy ground truth can be generated from the use of at least one of the distance sensors 32 from the sensor system 24 to identify objects in the area surrounding the vehicle 20 to determine which objects should have been found by the occupancy estimation model. For purposes of comparison, the occupancy ground truth can assign a ground truth value to each space in the 3D voxel grid to indicate if the space is occupied or empty.

The voxel from Block 104 can be passed through an occupancy network to determine if each space in the 3D grid of the voxel is occupied or empty before being compared to the occupancy ground truth. In one example, the occupancy loss is determined through cross-entropy, such as a voxel-wise cross-entropy calculation. The loss determined at Block 106 is then utilized to determine either a total objects loss at Block 114 or a total object fullness loss at Block 140 as will be discussed further below.

To determine the total object loss, the method 100 utilizes the voxel from Block 104 and proceeds to Block 116 to perform 3D an object detection on the voxel. The object detection performed at Block 116 can add bounding boxes, or another type of identification of objects, to the voxel or a 3D point cloud representation of the voxel to identify regions having detected objects. In one example, the object detection performed at Block 116 can be done by an object detection model utilizing a convolution neural network. The method 100 then proceeds to Block 118 to perform the object detection loss.

At Block 118, the method 100 compares a dataset, such as an object ground truth from Block 118, to the results of 3D object detection performed at Block 114. The comparison can be performed through anchor-wise cross-entropy with or without shape regression. In the illustrated example, the object ground truth can be generated by manually labeling objects in a dataset corresponding to a scene represented by the images from Block 102 with bounding boxes to identify objects that are actually in the scene. The object detection loss determines how closely the objects detected from Block 116 match the ground truth or actual objects that were in the scene.

The object detection loss performed at Block 118 outputs a loss that is multiplied at Block 112 by a weight (w) from Block 122. The weight (w) can address imbalances from positive and negative identifications between the object ground truth from Block 120 and the results of the 3D object detection from Block 116. The weighted loss is then added at Block 110 to the occupancy loss from Block 106 to determine the total object loss at Block 114.

The total object loss from Block 114 is backpropagated to Block 104 to update parameters of the occupancy estimation model to improve the occupancy estimation performed at Block 104 and reduce the total loss that the occupancy estimation model provides when compared to the ground truth. The method 100 can then be repeated on the images from Block 102 additional times to extract additional training value from the images and their associated occupancy ground truth and object ground truths. The method 100 can then be repeated on additional sets of images received from Block 102 with corresponding ground truths to further refine the occupancy estimation model in Block 104 with the total object loss from Block 114. The method 100 can be repeated until the total object loss from Block 114 is within a predetermined range of loss or is below a threshold loss value.

The flowchart of method 100 can also be used to determine the total object fullness loss at Block 140 in addition to the total object loss from Block 114 for updating the parameters of the occupancy estimation model in Block 104 to improve its accuracy.

To determine the object fullness loss at Block 130, the method 100 compares an object ground truth from Block 132 to the voxel from Block 104 utilizing EQ. 1 below. The object ground truth represents the actual objects in the scene.

$$\text{Object fullness loss} = 1 - \frac{\sum_{x \in GT(B)} sigmoid(P(x))}{\lfloor GT(B) \rfloor} \qquad \text{EQ. 1}$$

In EQ. 1 above, GT (B) includes a set of occupied voxels inside of box B for the occupancy ground truth and P (x) is the probability of occupancy for a voxel x, estimated by the occupancy estimation model. The lower the value output by EQ. 1, the closer the voxel from Block 104 is to the object ground truth from Block 132 and therefore, the closer hat voxel is to representing the actual scene. Each box B corresponds to 3D bounding boxes of objects of interest in the scene, that were previously detected or manually annotated.

The object fullness loss determined at Block 130 outputs a loss that is multiplied at Block 136 by a weight (w) from Block 134. The weight (w) can address imbalances from positive and negative identifications. The weighted loss is then added at Block 138 to the occupancy loss from Block 106 to determine the total object fullness loss at Block 140.

The total object fullness loss from Block 140 is backpropagated to Block 104 to update parameters of the occupancy estimation model to improve the accuracy of the occupancy estimation model at Block 104 and reduce the total loss it generates. The method 100 can then be repeated on the images from Block 102 additional times to extract the greatest training value from the images and their associated occupancy and object ground truths. The method 100 can then be repeated on additional sets of images with corresponding ground truths to further refine the occupancy estimation model in Block 104. The method 100 can be repeated until the total loss determined by the method 100 is within a predetermined range or losses or is below a threshold loss value.

Figure 3:
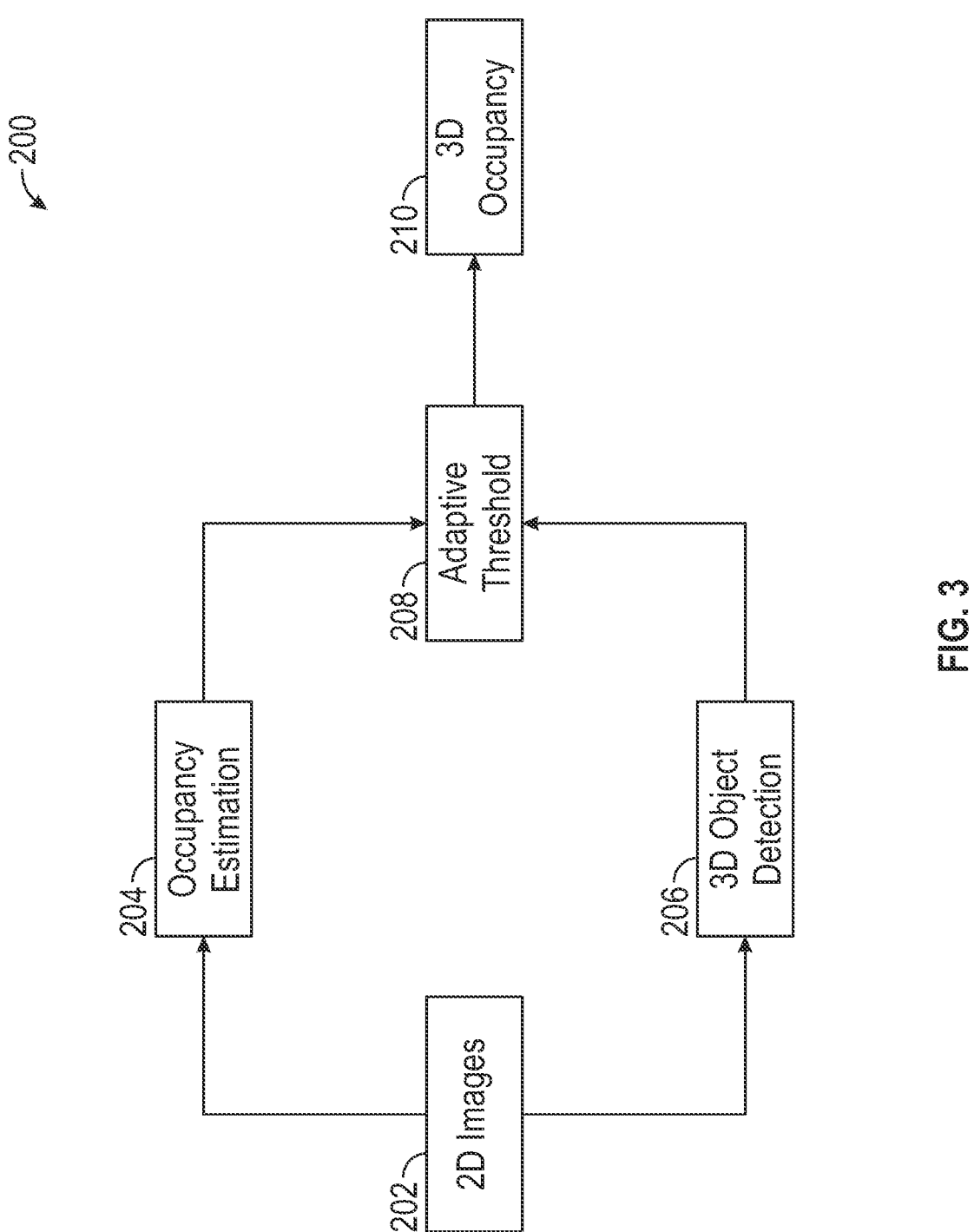
FIG. 3 illustrates a flowchart of a method of determining occupancy utilizing an adaptive probability threshold.

FIG. 3 illustrates a method 200 of applying an adaptive threshold to 3D occupancy estimation. Method 200 begins with receiving a plurality of images, such as 2D images captured by the optical sensors 30 on the vehicle 20, at Block 202. The method 200 then proceeds to perform 3D object detection at Block 206 on the plurality of images from Block 202. In one example, the object detection performed at Block 206 locates potential objects in bounding boxes in the images from Block 202.

The method 200 also performs occupancy estimation at Block 204 with the images from Block 202. In the illustrated example, the occupancy estimation can be performed by an occupancy estimation model trained by the method 100 described above or by another occupancy estimation model. As discussed above, the occupancy estimation model outputs a probability of occupancy P (x). The method 200 then proceeds to Block 208 to utilize an adaptive threshold.

The adaptive threshold from Block 208 is utilized by the method 200 to determine 3D occupancy in Block 210. In particular, the adaptive threshold utilizes a higher threshold for determining occupancy for regions outside of the bounding boxes identified by Block 206 and a lower threshold for determining occupancy for regions within the bounding boxes from Block 206. This adaptive approach to determining 3D occupancy can be applied to the vehicle 20 in real time to identify objects in an area surrounding the vehicle 20.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure not be limited to the particular embodiments disclosed but will include embodiments falling within the scope thereof.

What is claimed is:

1. A method of updating parameters of an occupancy estimation model, the method comprising:
   receiving a plurality of images, wherein the plurality of images are two-dimensional;
   utilizing the occupancy estimation model to generate a voxel based on the plurality of images;
   determining an occupancy loss by comparing the voxel to an occupancy ground truth corresponding to the voxel;
   determining an object loss by comparing the voxel to an object ground truth;
   combining the object loss with the occupancy loss to determine a total loss for the voxel; and
   updating parameters of the occupancy estimation model to reduce the total loss determined.

2. The method of claim 1, including applying a weight to the object loss when combined with the occupancy loss to determine the total loss.

3. The method of claim 1, wherein comparing the voxel to the occupancy ground truth is performed on a voxel-wise cross-entropy basis.

4. The method of claim 1, wherein the object loss is multiplied by a weight before being combined with the occupancy loss to determine the total loss.

5. The method of claim 1, wherein the object loss includes an object detection loss and utilizing an object detection model to identify detected objects in the voxel.

6. The method of claim 5, wherein the object detection loss includes comparing an object ground truth for the voxel to the detected objects.

7. The method of claim 6, wherein comparing the object ground truth for the voxel to the detected objects includes at least one of cross-entropy or shape regression.

8. The method of claim 1, wherein the object loss includes an object fullness loss and determining the object fullness loss includes comparing a set of occupied voxels defined within a bounding box from the object ground truth compared to a probability of occupancy estimated by the occupancy estimation model.

9. A non-transitory computer-readable storage medium embodying programmed instructions which, when executed by a processor, are operable for performing a method comprising:

receiving a plurality of images, wherein the plurality of images are two-dimensional;
   utilizing an occupancy estimation model to generate a voxel based on the plurality of images;
   determining an occupancy loss by comparing the voxel to an occupancy ground truth corresponding to the voxel;
   determining an object loss by comparing the voxel to an object ground truth;
   combining the object loss with the occupancy loss to determine a total loss for the voxel; and
   updating parameters of the occupancy estimation model to reduce the total loss determined.

10. The computer-readable storage medium of claim 9, wherein the method includes applying a weight to the object loss when combining with the occupancy loss to determine the total loss.

11. The computer-readable storage medium of claim 9, wherein comparing the voxel to the occupancy ground truth is performed on a voxel-wise cross-entropy basis.

12. The computer-readable storage medium of claim 9, wherein the object loss is multiplied by a weight before being combined with the occupancy loss to determine the total loss.

13. The computer-readable storage medium of claim 9, wherein the object loss includes an object detection loss and utilizing an object detection model to identify detected objects in the voxel.

14. The computer-readable storage medium of claim 13, wherein the object detection loss includes comparing an object ground truth for the voxel to the detected objects.

15. The computer-readable storage medium of claim 14, wherein comparing the object ground truth for the voxel to the detected objects includes at least one of cross-entropy or shape regression.

16. The computer-readable storage medium of claim 9, wherein the object loss includes an object fullness loss and determining the object fullness loss includes comparing a set of occupied voxels defined within a bounding box from the object ground truth compared to a probability of occupancy estimated by the occupancy estimation model.

17. A vehicle system comprising:
   at least one optical sensor and a controller in data communication with the at least one optical sensor, wherein the controller configured to:
   receive a plurality of images, wherein the plurality of images are two-dimensional optical images;
   perform an occupancy estimation on the plurality of images with an occupation estimation model to generate a voxel;
   perform a three-dimensional object detection on the plurality of images to identify at least one region associated with an object of interest; and
   vary a probability threshold for identifying an object in the voxel based on the three-dimensional object detection, wherein the probability threshold for identifying objects is reduced for a portion of the voxel that corresponds to the at least one region associated with the object of interest when compared to the probability threshold for identifying the objects outside of the at least one region associated with the object of interest.

18. The vehicle system of claim 17, wherein the occupation estimation model is trained by:
   receiving a plurality of training images, wherein the plurality of training images are two-dimensional;
   utilizing an occupancy estimation model to generate a voxel based on the plurality of training images;

determining an occupancy loss by comparing the voxel to an occupancy ground truth corresponding to the voxel;

determining an object loss by comparing the voxel to an object ground truth;

combining the object loss with the occupancy loss to determine a total loss for the voxel; and updating parameters of the occupancy estimation model to reduce the total loss determined.

19. The vehicle system of claim 18, wherein the object loss includes an object detection loss and utilizing an object detection model to identify detected objects in the voxel;

the object detection loss includes comparing an object ground truth for the voxel to the detected objects; and comparing the object ground truth for the voxel to the detected objects includes at least one of cross-entropy or shape regression.

20. The vehicle system of claim 18, wherein the object loss includes an object fullness loss and determining the object fullness loss includes comparing a set of occupied voxels defined within a bounding box from the object ground truth compared to a probability of occupancy estimated by the occupancy estimation model.

* * * * *